United States Patent [19]
Galpin

[11] Patent Number: 5,345,496
[45] Date of Patent: Sep. 6, 1994

[54] REMOTE LINE TEST FACILITY

[75] Inventor: Robert K. P. Galpin, Knutsford, United Kingdom

[73] Assignee: GPT Limited, England

[21] Appl. No.: 139,335

[22] Filed: Oct. 19, 1993

Related U.S. Application Data

[63] Continuation of Ser. No. 840,873, Feb. 25, 1992, abandoned.

[30] Foreign Application Priority Data

Feb. 27, 1991 [GB] United Kingdom ................ 9104133

[51] Int. Cl.$^5$ ......................... H04M 1/24; H04B 3/46
[52] U.S. Cl. ......................................... 379/29; 379/30
[58] Field of Search ...................... 379/27, 26, 29, 30, 379/1, 24

[56] References Cited

U.S. PATENT DOCUMENTS

| | | | |
|---|---|---|---|
| 4,079,210 | 3/1978 | Sanderson | 379/27 |
| 4,196,321 | 4/1980 | Bosik | 379/27 X |
| 4,320,258 | 3/1982 | McDonald | 379/201 |
| 4,709,386 | 11/1987 | Shimizu | 379/24 |
| 5,054,050 | 10/1991 | Burke et al. | 379/29 X |

FOREIGN PATENT DOCUMENTS

WO8903622 4/1989 PCT Int'l Appl. .
2149616 6/1985 United Kingdom .

*Primary Examiner*—Stephen Chin
*Assistant Examiner*—Paul Loomis
*Attorney, Agent, or Firm*—Kirschstein, Ottinger, Isreal & Schiffmiller

[57] ABSTRACT

Circuitry is provided for testing telephone lines, the circuitry comprising a loop current ring trip detector and a relay which in operation is used to break normal current to provide an end of call indication, and wherein said relay is also operative in one test mode to switch from said loop current ring detector to a comparator which functions as a test mode detector. The means may also include a second relay which when the circuit is in a second test mode is operated simultaneously with the first relay, the second relay being connected to a bell capacitor the discharge rate of which can be measured by said capacitor, and the comparator output is sequentially monitored to provide information as to the condition of the insulation and regarding bell capacitor and terminal connection.

4 Claims, 1 Drawing Sheet

1

REMOTE LINE TEST FACILITY

This is a continuation of Ser. No. 07/840,873, filed Feb. 25, 1992, now abandoned.

BACKGROUND OF THE INVENTION

1. Field of the Invention

The present invention concerns the testing of Data Transmission Lines and is particularly, but not exclusively, concerned with the testing of telephone lines when used for transmitting data.

2. Description of Related Art

Current line test methods rely on the connection of the line to be tested to a test facility in the exchange or remote multiplexer. The test facility carries out a series of functional and parametric measurements. From these measurements a diagnosis of the status of the line is then attempted, either manually or automatically, by setting parametric thesholds in the test facility. Testing is either 'routine', to confirm the 'health' of the line and its termination or 'on-demand' in response to a customer complaint. In the latter case the key requirements of the test are to establish that there actually is a problem and, if so, where the problem is. The latter test is necessary in order to discover who is responsible for curing the error. Known test equipment is expensive so the facility it provides is shared over as many lines as possible, there being typically one test unit per exchange.

The main objective when testing a line is to determine whether there are any symptoms of faults which could affect customer service, and if so, whether a service repair is needed. The principal faults are likely to be poor insulation, disconnection of the master socket, or the terminal being not properly connected. The first two would require action by the network operator, while the last is the customer's problem.

With the current trend in network planning towards fewer exchanges, with more remote concentrators and multiplexers and the use of optical fiber transmission, the cost overhead of providing conventional test facilities for the local lines is becoming prohibitive. The smallest multiplexer is the pair gain adaptor, where a number of Plain Ordinary Telephone System (POTS) lines (usually two) are connected to the exchange over a single copper pair, the pair gain adaptor being located close to (or in) the customers' premises. However, the adaptor is still the responsibility of the Network Operator, and the lines to each customer's master socket, the network terminating point (NTP), still need to be tested both routinely and on demand; accordingly a new approach to line testing is needed.

SUMMARY OF THE INVENTION

Accordingly, from one aspect the present invention comprises a circuit for testing data transmission lines, comprising a loop/current ring detector, and a relay which in operation is used to break normal current to provide an end of call indication, and wherein said relay is also operative in one test mode to switch from said loop/current ring detector to a comparator which functions as a test mode detector.

The circuit may also include a second relay which when the circuit is in a second test mode is operated simultaneously with the first relay, said second relay being connected to a bell capacitor the discharge rate of which can be measured by said capacitor.

BRIEF DESCRIPTION OF THE DRAWING

In order that the invention may be more readily understood an embodiment thereof will now be described by way of example and with reference to the single Figure, FIG. 1, of the accompanying drawing, which figure is a circuit diagram of a remote line test facility for POTS lines according to the present invention.

DETAILED DESCRIPTION OF THE PREFERRED EMBODIMENT

Figure 1:
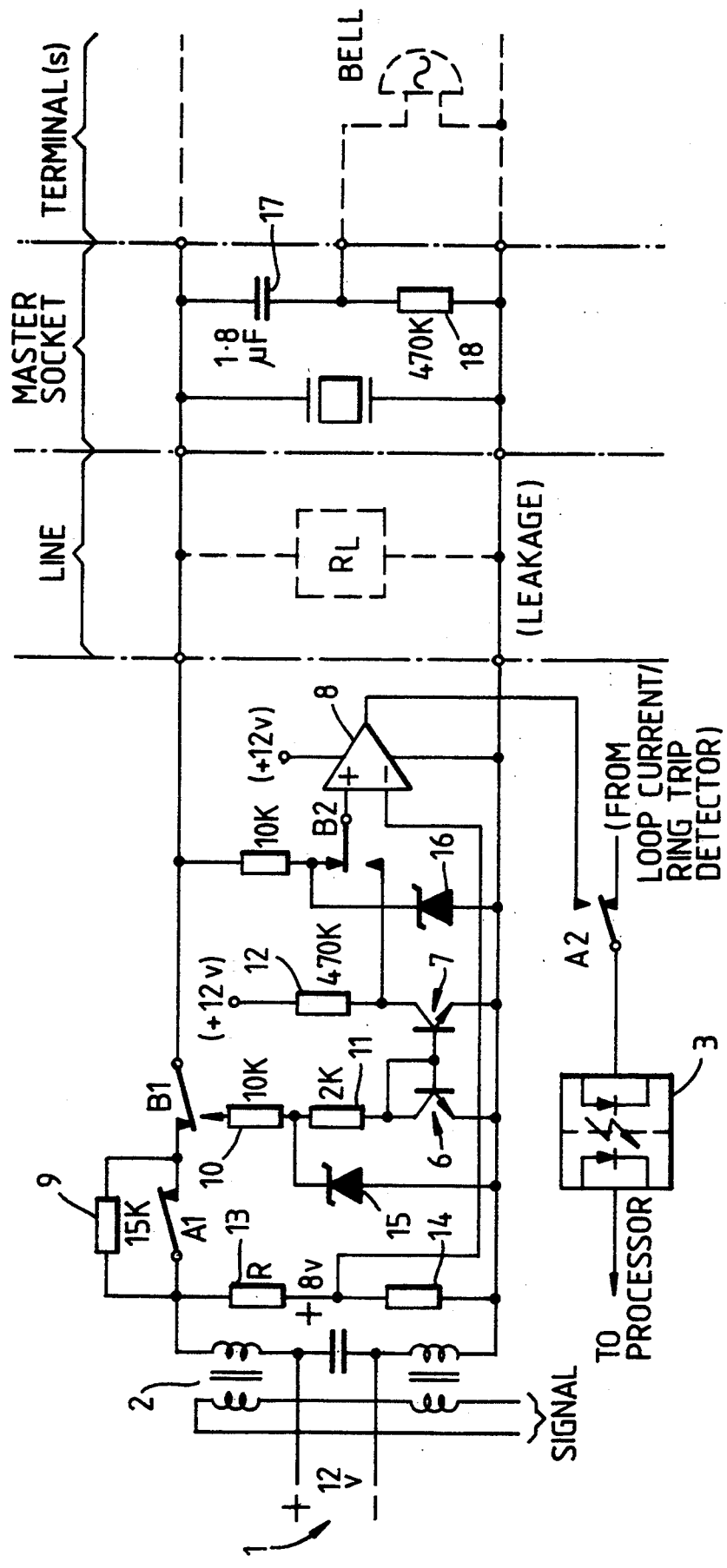

As shown in the drawing the basic line circuit comprises a 12 volt source 1 derived from an isolated winding of a switched-mode power supply (not shown) and connected to a balanced signal interface transformer 2. The circuit would also include a ring feed and ring trip detector and a loop current detector which are entirely standard and are not shown. The loop current detector in operation signals to the system processor via an optical coupler 3. A relay A (not shown) is also provided whose contact A1 is used to break the normal current to provide an end of call indication. This is ,also conventional. However the circuit further includes a relay B (not shown) having contacts B1 and B2, a current mirror provided by transistors 6 and 7, a comparator 8, resistors 9, 10, 11, 12, 13 and 14, diodes 15 and 16 and a second contact A2 on relay A. A possible leakage in the line is shown at RL and the usual bell capacitor is shown at 17. The sequence of operation of this circuit is as follows:

1. Relay A is operated to insert resistor 9 in one leg of the circuit which is also used for end of call indication. This is done by means of contact A1. The operation of Relay A also switches the optical coupler 3 from the loop current/ring trip detector to comparator 8 by means of contact A2. Comparator 8 functions as a test mode detector. Once this has been done any leakage across the line will then be in series with resistor 9 and will attenuate the voltage seen by the comparator 8. If the voltage drops below the reference value the presence of a leaky line is indicated by the output of comparator 8 going low. The required leakage threshold can be set by resistor 9 and the voltage reference R, defined by resistors 13, 14, to comparator 8. As can be seen in the figure, in this embodiment the reference voltage is +8 volts and this sets the threshold at 33 $\mu$mhos (RL=30 kohms), providing a comfortable margin below 100 $\mu$mhos which would affect service. Thus if the comparator output is sampled after 100 ms, logic 1=high insulation (i.e. greater than 30 kohms)
logic 0=low insulation (i.e. less than 30 kohms)

2. After 10 ms relay 'A' is released short circuiting resistor 9.

It is advisable to allow 190 ms to elapse to make good any discharge of the bell capacitor 17 due to leakage across the line.

3. The next step of the test procedure is to operate both the relays. The B1 contact disconnects the line from the +12 volt source and allows the bell capacitor 17 to discharge via resistors 10 and 11 and transistor 6. Under normal conditions the discharge path of resistors 10, 11 and transistor 6 will limit the current to 1 .mA. The current through transistor 6 is reflected into resistor 12 via the current mirror provided by transistors 6 and 7, and the voltage across resistor 12 being fed via the B2 contact into the comparator 8.

If the bell capacitor 17 is not connected, the absence of discharge current through transistors 6 and 7 and resistor 12 will keep the collector of transistor 7 high and the output of comparator 8 will immediately be driven high.

If the bell capacitor 17 is connected but no terminal is connected, its discharge rate will be limited by an associated resistor 18 in series with the combination of resistors 10 and 11, and RL if present. The share of the discharge current from the bell capacitor 17 passing through resistors 10 and 11 and hence through resistor 12 will be determined by the value of RL. If RL is very high, the voltage across resistor 12 will reflect the voltage across the discharging bell capacitor 17 and the output of comparator 8 will go high after about 930 ms. If RL is close to the 30 kohms limit, the current through resistors 10, 11 and 12 will be reduced by 7/5 and the output of comparator 8 should go high after about 640 mS.

Terminals are typically classified by their Ring Equivalent Number (REN). If there is a terminal of 1 REN connected the discharge will be much faster but because of the voltage gain given by resistor 12 the capacitor 17 has to discharge to a much lower voltage before the current is low enough for the output of comparator 8 to go high. If RL is very high this should happen after about 150 mS or after about 110 mS if RL=30 kohms.

Modern ringers, although rated at 1 REN, can be less than that. A REN of 0.5 would increase the discharge time constant to about 47 mS, and the threshold time to about 190 mS with no leakage or about 155 mS with RL=30 kohms. A load of 3 REN would reduce the 150 mS to 120 mS and the 110 mS to about 85 mS.

The above figures are based on nominal component values but a timing threshold of 350 mS should give sufficient margin between 640 mS and 190 mS, the limiting values above, to accommodate normal component tolerances whilst discriminating between having or not having a terminal connected to the line. Accordingly;

```
if the comparator output is sampled after 5 mS,
  logic 1 = bell capacitor disconnected
        0 = bell capacitor connected;
and sampled again after 350 mS,
  logic 1 = terminal connected
        0 = no terminal connected.
```

4. After 360 mS the relay B is released. This means the line is connected to the line feed source via resistor 9 which will restrict the current surge to less than 1 mA to prevent "bell tinkle".

5. Release the A relay. This short-circuits resistor 9 for normal line feed and reconnects the optical coupler to the loop current/ring trip detector function.

In summary, the test cycle is as follows:

```
t = 0,       operate A relay
t = 100 mS,  Sample comparator: 1 = high insulation
                                    (30 ohms)
                                0 = low insulation
                                    (30 ohms)
t = 110 mS,  release A relay
t = 300 mS,  operate A and B
             relays
t = 305 mS,  sample comparator: 1 = capacitor disconnected
                                0 = capacitor connected
t = 650 mS,  sample comparator: 1 = terminal connected
                                0 = no terminal connected
t = 660 mS,  release B relay
t = 750 mS,  release A relay,
```
```
             test complete.
```

The diodes 15 and 16 are typically 13 volt zener diodes and are provided to protect the mirror transistors 6 and 7 and comparator 8 against excessive voltage applied to the POTS port.

The voltage component and timing values given above are specific to the particular circuit described and can be modified to suit other applications. For example the concept of the above circuit can also be extended to applications where the line circuit is not isolated but connected to a power source having an earth reference. In this case the invention can also be used to detect leakage to earth.

The embodiment just described shows the invention integrated with the line circuit for use in a pair gain application. However for applications where more line circuits are terminated together such as a small multiplexer, it may be more convenient to implement the invention as a separate entity to be connected to each line severally via conventional test access relays.

I claim:

1. A circuit for testing one subscriber line of a pair-gain telephone system, the subscriber line including an end-of-call indication relay to insert an end-of-call resistance connectable in the subscriber line, an opto-coupler for loop current and ring-trip detection and having a line voltage applied thereon, the circuit comprising a voltage source to provide from the line voltage an output voltage isolated from other subscriber lines, the circuit further comprising;

a voltage comparator having a pair of inputs and an output;

two resistances serially connected to provide a fraction of the line voltage for use as a reference voltage to one of the inputs to the comparator; and test means for testing leakage resistance on the line, comprising additional contact means on said end-of-call indication relay to connect the output of the comparator to the optical coupler in the test mode thereby enabling the said processor to process the comparator output signal, any leakage resistance forming a potential divider with the end-of-call resistance to which the other of the inputs to the comparator is connected, thereby enabling the comparator to compare the fraction of the normal line voltage generated by the leakage resistance in series with the end-of-call indication resistance with the reference voltage and to generate an output test signal indicative of the leakage resistance being above or below a predetermined value.

2. A circuit as claimed in claim 1, including a current mirror and further relay means operative, in a second test mode, simultaneously with the end-of-call indication relay for testing the discharge rate of a telephone subscriber bell capacitor, said further relay means being operative for disconnecting the line from the line voltage source and connecting the line to the other input of the comparator via the current mirror.

3. A circuit as claimed in claim 2, wherein the end-of-call indication relay and the further relay are sequentially operated to monitor the output of the comparator, thereby providing information as to the condition of the line insulation, the bell capacitor and the terminal line connection.

4. The circuit as claimed in claim 3, wherein the further relay is released followed by the end-of-call indication relay being released.

* * * * *